United States Patent [19]

Werner

[11] 4,408,926

[45] Oct. 11, 1983

[54] AXIAL CRIMP CONNECTION DEVICE

[75] Inventor: Walter M. Werner, Downingtown, Pa.

[73] Assignee: AMP Incorporated, Harrisburg, Pa.

[21] Appl. No.: 267,212

[22] Filed: May 26, 1981

[51] Int. Cl.³ .............................................. F16B 2/02
[52] U.S. Cl. .................................... 403/310; 403/309; 403/300; 403/311; 403/314; 403/290
[58] Field of Search ............... 403/310, 311, 314, 369, 403/309, 281, 290

[56] References Cited

U.S. PATENT DOCUMENTS

| 110,590 | 12/1870 | Reinshagen | 403/314 |
| 2,138,913 | 12/1938 | Fotch | 403/314 X |
| 2,160,694 | 5/1939 | Buchanan | 403/281 X |
| 3,374,511 | 1/1968 | Barker | 403/369 |
| 3,737,840 | 6/1973 | Hoffman | 339/273 F |
| 4,252,992 | 2/1981 | Cherry et al. | 174/90 |

FOREIGN PATENT DOCUMENTS 795549  1/1936  France .................. 403/310

Primary Examiner—Andrew V. Kundrat
Assistant Examiner—Joseph A. Fischetti
Attorney, Agent, or Firm—Allan B. Osborne

[57] ABSTRACT

The present invention relates to a device for connecting the ends of cable, wire or other cylindrical objects together. More particularly, the invention includes an elongated jaw assembly with openings at each end adapted to receive the objects to be joined. The outer surface of the jaw assembly is tapered towards the ends to slidingly receive collars which, when driven onto the jaw assembly, axially compress the jaw assembly down around the inserted objects.

2 Claims, 8 Drawing Figures

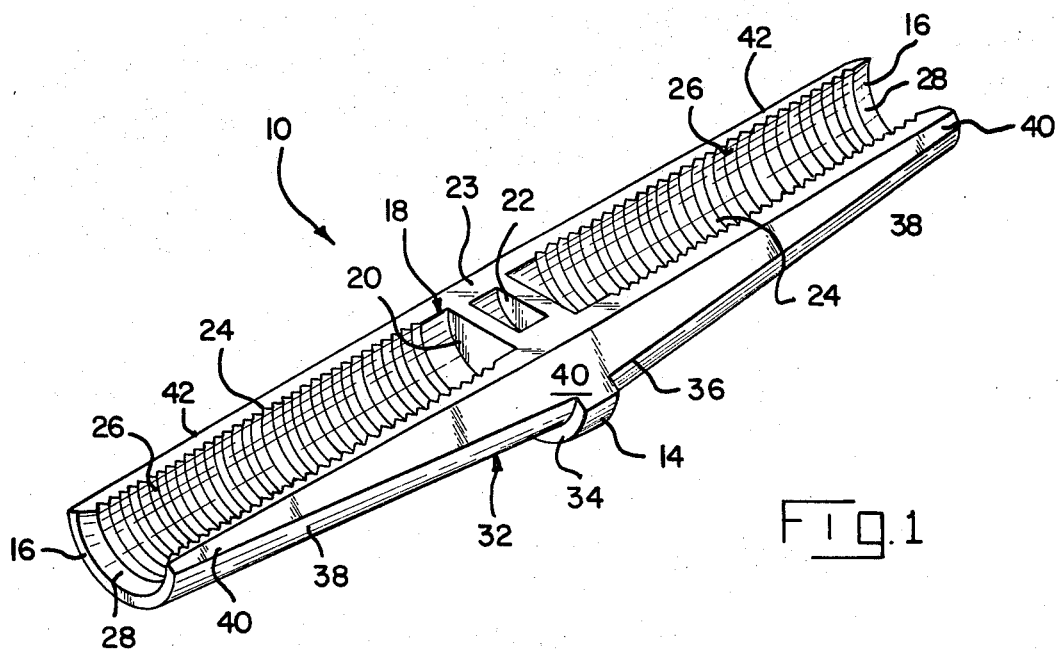
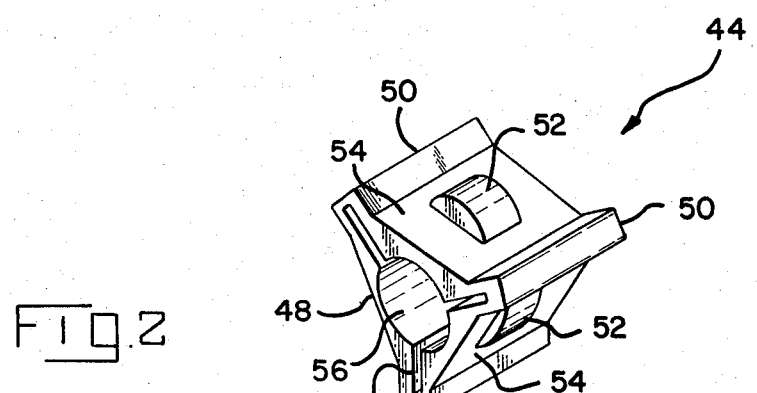
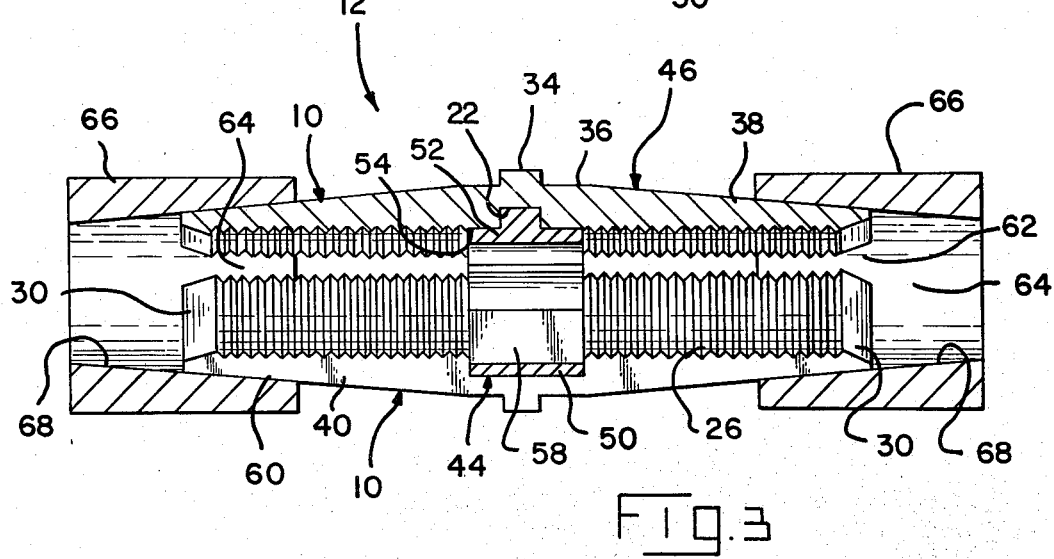

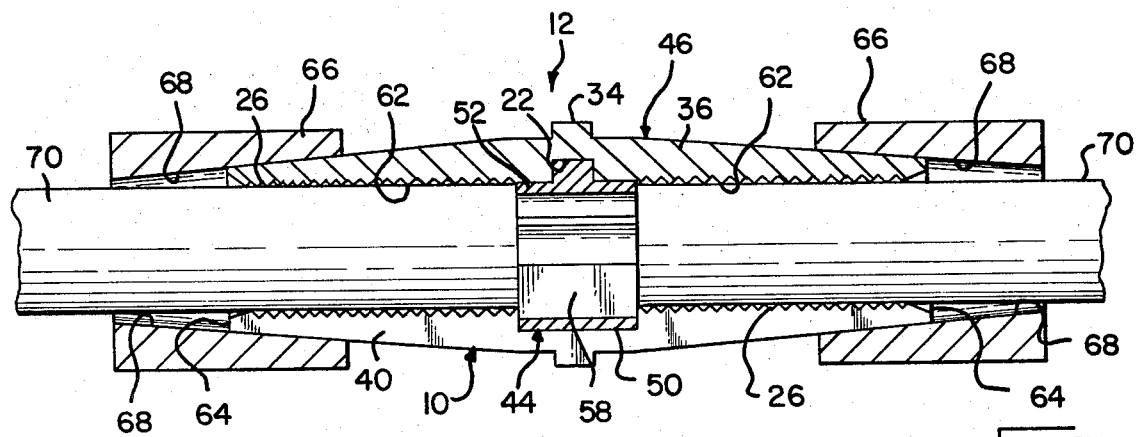
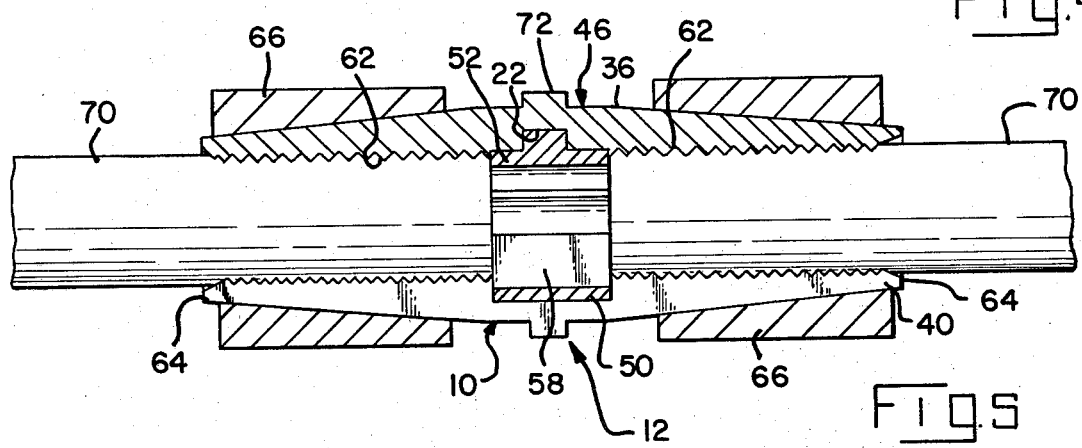
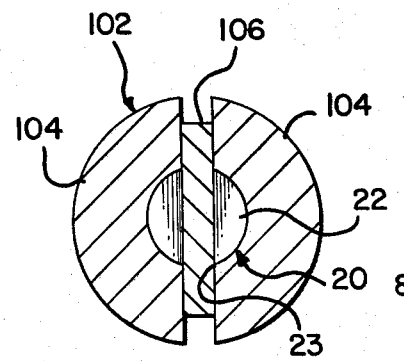
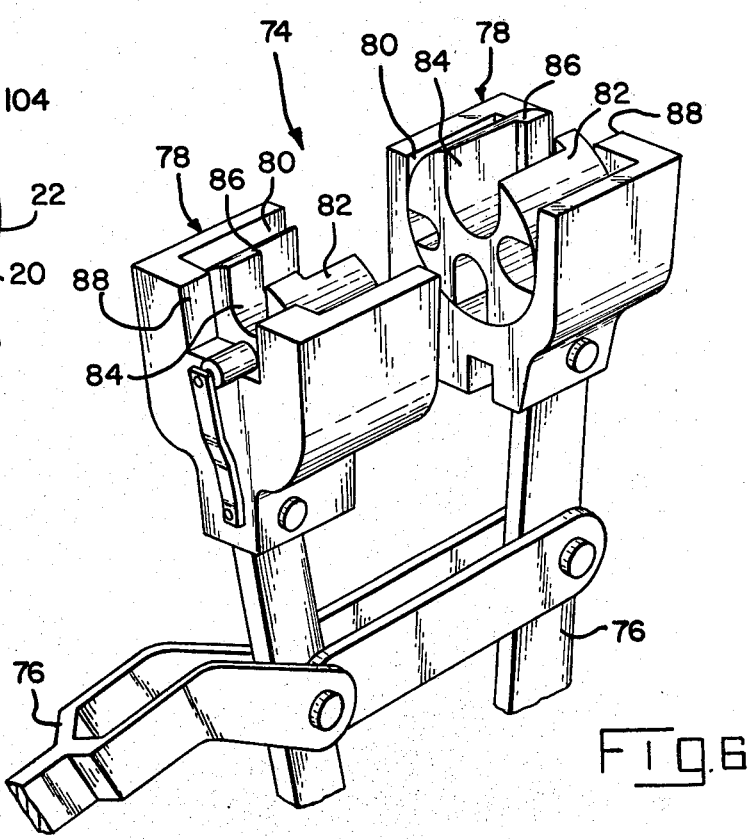

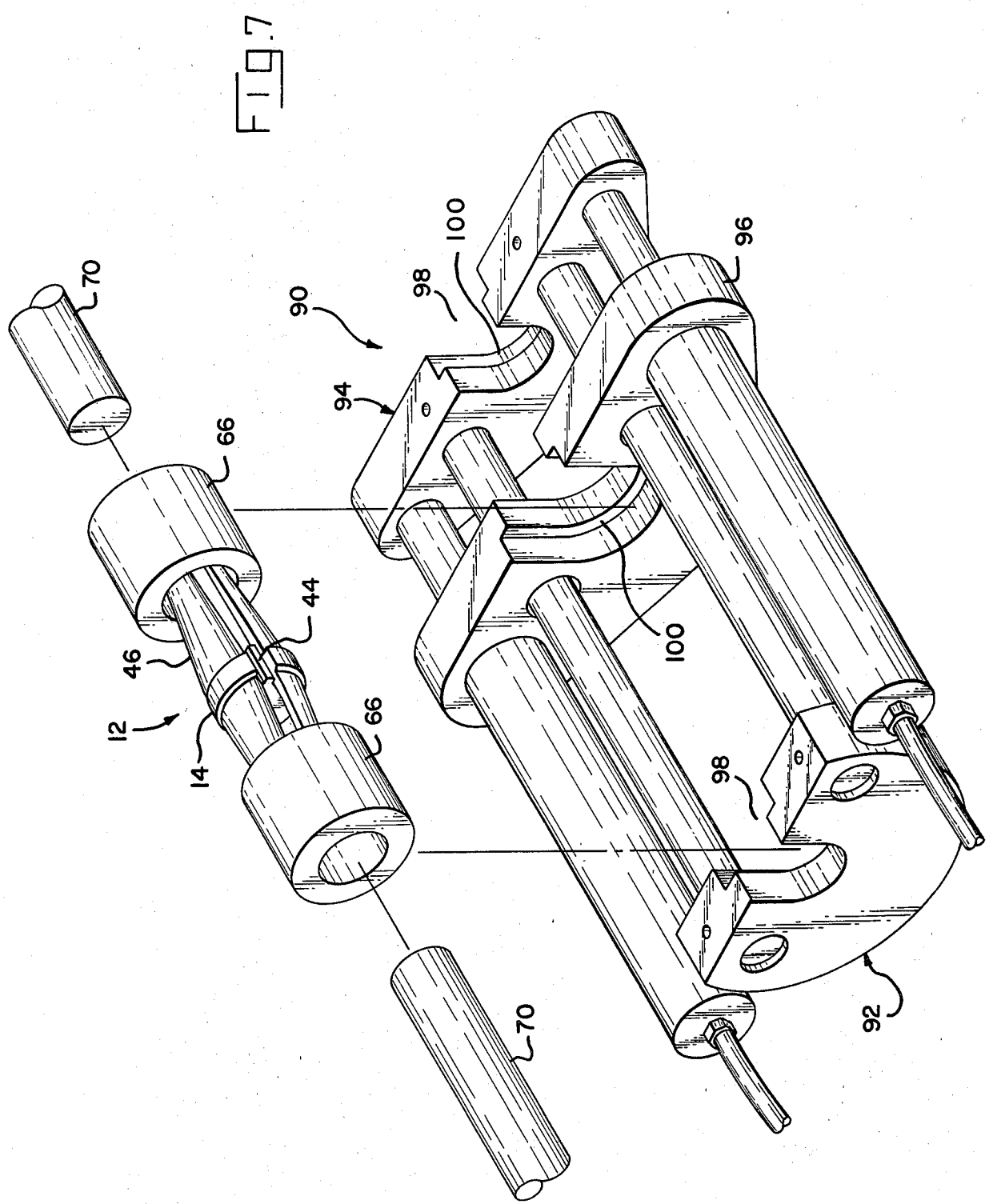

AXIAL CRIMP CONNECTION DEVICE

BACKGROUND OF THE INVENTION

1. The Field of the Invention

The invention disclosed herein is a device in which a compressive force results from the action of a straight line motion on a body having a tapered surface.

2. The Prior Art

The prior art includes devices such as disclosed in U.S. Pat. Nos. 3,737,840 and 4,252,992. In '840 a deformable, star-shaped connector with a wire receiving passage therethrough is compressed inwardly around the wire by being driven into a body having a tapered opening therethrough. The device disclosed in '992 includes a plurality of jaws which are driven down a tapered passageway and thereby gripping cable ends which were inserted into the passageway.

SUMMARY OF THE INVENTION

The invention disclosed herein includes a jaw assembly composed of two or more elongated jaw segments, each of which has a curved surface and also a channel containing surface. The segment is thicker at the midpoint and thins towards each end; i.e., one surface relative to the other surface, is beveled so that when the two or more segments are assembled together, the surfaces cooperate to form a tapered outer surface with the taper being towards each end. Further, the channels on the other surfaces cooperate to form cable receiving passages with openings at each end. With cables or other cylindrical objects inserted into the passages, collars, mounted on the assembly at each end, are driven along the tapered surface towards the midpoint. The jaw segments are axially compressed down onto the objects to secure them in the assembly.

BRIEF DESCRIPTION OF THE DRAWINGS

FIG. 1 is a perspective view of a jaw segment constructed in accordance with the concepts of the present invention;

FIG. 2 is a perspective view of a jaw assembly spacer used in conjunction with three jaw segments of FIG. 1 to form a jaw assembly;

FIG. 3 is a side cross-sectional view of a jaw assembly and collars which together form the axial crimp connecting device of the present invention;

FIGS. 4 and 5 are side cross-sectional views of the axial crimp connecting device of FIG. 3 illustrating the utility thereof;

FIG. 6 is a perspective view of a hand tool which may be used with the device of the present invention;

FIG. 7 is a perspective view of the axial crimp connecting device of FIG. 3 and a hydraulic tool which may be used therewith; and FIG. 8 is a cross-sectional view, taken perpendicular to the longitudinal axis of a jaw assembly formed from two jaw segments and a spacer, both of which are constructed in accordance with the concepts of the present invention.

DESCRIPTION OF THE INVENTION

FIG. 1 illustrates, in perspective, an elongated jaw segment 10 which is the basic building block of the axial crimp connection device 12 shown in FIGS. 3–5 and 7. The segment is preferably cast from A-356-T-6 or 6061-T-6 aluminum. The midpoint 14 of the segment, positioned centrally from ends 16, serves as the reference point throughout the following description. The midpoint is the thickest portion of the segment.

The midpoint on the first surface 18 of segment 10 is defined by a wall 20 which contains an arcuate shaped cavity 22 in its surface 23. U-shaped channels 24 extend along the first surface from each side of wall 20 outwardly to the ends 16 of the segment. Teeth 26 are provided on the walls defining the channels. Openings 28 to the channel at the ends are beveled as indicated by reference numeral 30 in FIG. 3.

The midpoint on the second surface 32 of segment 10 is defined by a rim 34. On either side of the rim the second surface may be flat as indicated by reference numeral 36. Outwardly from these flat portions, the second surface is beveled in towards the first surface so that those portions 38 of the segment are wedged-shaped; i.e., the portions of the segment extending outwardly from the flat portions to ends 16. Note that the second surface is beveled relative to the first surface. The cross-sectional view in FIG. 3 illustrates the structure.

Second surface 32 is curved from one side 40 of the segment to the other side 42. The second surface describes a curvature of 120 degrees. Accordingly, the sides 40 and 42 are not on the same plane relative to each other but are on an angle; i.e., an angle of thirty degrees as measured from an imaginary line lying on the same plane as the surface 23 of wall 20.

FIG. 2 is a perspective view of a spacer 44 which is used in making jaw assembly 46 of FIGS. 3–5 and 7. The assembly consists of three jaw segments 10 positioned around spacer 44.

Spacer 44 may be molded using polyethylene as the material. The spacer has a triangular body 48 (as viewed from an end) from which three flanges 50 project from the corners of the body. Outwardly projecting, arcuate-shaped lobes 52 are located on the flat surfaces 54 of the body between the flanges.

Body 48 of the spacer is substantially hollow by reason of a hole 56 and slots 58 extending therethrough. The slots 56 extend laterally into the interior of flanges 50 from the hole. By reason of being hollow and being made from polyethylene, spacer 44 is easily compressible.

Jaw assembly 46 is put together by placing three jaw segments around spacer 44. Each segment lies between adjacent flanges 50 with arcuate shaped lobe 52 being received in arcuate shaped cavity 22 in wall 20. The cross-sectional view in FIG. 3 illustrates the arrangement. The flanges and lobes cooperate to hold the jaw segments together in a spaced apart fashion; i.e., the jaw segments can be moved in towards each other under a compressive force. The assembly is an elongated, cylindrical shape with tapered ends hereinafter designated by reference numeral 60. The channels cooperate to form passages 62 in the jaw assembly with openings 64 at each end. Teeth 26 face into the two passages.

Axial crimp connecting device 12 is formed by adding collars 66 to jaw assembly 46. These collars are shown in cross-section in FIG. 3 with one mounted on each end 60 of assembly 46. The collars are tubular and have a tapered passage 68 extending longitudinally therethrough. The collars are positioned onto ends 60 with the converging walls of passages 68 facing longitudinally away from the assembly. Again, the drawing in FIG. 3 illustrates this arrangement.

In FIG. 4, two cylindrical objects 70 have been inserted into passages 62 through passages 68 of collars 66 and openings 64 of the assembly 46. The objects 70 can be electrical wires, cables, reinforcing rods, tubing and so forth.

FIG. 5 illustrates how objects 70 are secured in device 12. Collars 66 have been driven along the outer surfaces of jaw assembly 46 towards the collective midpoints of the assembly, hereinafter designated by reference numeral 72. As the collars are being so driven, cooperation between the tapered outer surfaces on the assembly and tapered passages in the collars axially compress the individual jaw segments 10 and spacer 44 inwardly towards the longitudinal center line (not shown). The objects 70 are forcefully gripped between the jaw segments with teeth 26 biting into the objects.

FIG. 6 shows a hand operated tool 74 which may be used for driving collars 66 further onto jaw assembly 46. The tool includes conventional handles 76 which when moved towards each other, move the two driving heads 78 towards each other in conventional manner. The driving heads 78 have a U-shaped cavity 80 in which inserts 82 are positioned. These inserts contain U-shaped channels 84 with each channel having a reduced width portion to provide a shoulder 86. As the drawings show, the several channels 84 vary in size so as to accept different size devices 12.

With the driving heads apart as shown in FIG. 6, a device 12 is placed thereinto so that the outward-facing ends of collars 66 are abutting shoulders 86. Objects 70 are then inserted into devices 12 through notches 88 in heads 78. Collars 66 are forced further onto assembly 46 by moving the heads together via movement of handles 76.

FIG. 7 shows a hydraulic tool 90 which may be used for driving collars 66 further onto jaw assembly 46. This tool is particularly useful for larger sizes of device 12. Tool 90 includes two stationary members 92 and 94 with the latter used to remove collars 66 from a jaw assembly. The third member 96 is hydraulically movable relative to the first two. In each member, a U-shaped notch 98 is provided with each having a shoulder 100. In driving the collars onto the assembly, the device 12 is placed into the notches in members 92 and 96 with shoulders 100 bearing on the end faces of collars 66. After objects 70 have been inserted into passages 62, member 96 is advanced towards member 92 thereby driving the collars further onto assembly 46.

In removing collars 66 which have been previously driven onto an assembly, the device is placed into the notches on members 94 and 96 with shoulders 100 bearing against the end faces of the collars facing midpoint 72. Upon advancing member 96 towards member 92, the collars will be removed from the assembly.

FIG. 8 is an end view of a second embodiment of a jaw assembly, referred to by reference numeral 102. Assembly 102 includes two jaw segments 104 and a spacer 106. The jaw segments differ from segments 10 in that each second surface describes an arc of 180 degrees. Spacer 106 differs in being generally rectangular with a lobe (not shown) on each side. A device (not shown) employing assembly 102 uses collars 66 in the same manner as assembly 46.

The present invention may be subject to many modifications and changes without departing from the spirit or essential characteristics thereof. The present embodiment is therefore intended in all respects as being illustrative and not restrictive of the scope of the invention.

I claim:

1. A device for connecting two cylindrical objects together, said device comprising:
   a. a jaw assembly of three elongated jaw segments, each segment having a first, U-shaped surface and generally opposite thereto a second surface which is curved from one side to the other and is beveled towards the first surface from adjacent the midpoint out to each end, said segments being joined together to form a jaw assembly having an interior passage adapted to receive cylindrical objects from each end and an outer, cylindrical surface which is tapered from adjacent the midpoint to the ends;
   b. a spacer of compressible material having three sides with flanges extending outwardly from the corners thereof, said spacer being positioned in the assembly with each flange between adjacent segments for holding the segments together in spaced apart fashion; and
   c. a pair of collars, each having a tapered passage therethrough, said collars being slidably mounted on each end of the jaw assembly with the wider end of the passage being placed on the assembly first so that upon driving the collars along the tapered surface of the assembly towards the midpoint, the jaw segments are axially compressed onto cylindrical objects which may be placed in the passage of the assembly.

2. A device for connecting two cylindrical objects together, said device comprising:
   a. two identical, elongated jaw segments with each segment having U-shaped channels in one surface with a wall in between the channels, said wall having an arcuate shaped cavity located in the top surface thereof, and an opposite surface which is curved from one side to the other and beveled towards the other surface with the bevel being from adjacent the midpoint outwardly to each end,
   b. a rectangular spacer of compressible material having a lobe on each side positioned between the two jaw segments with the lobe being received in the cavities to hold the segments together to form a jaw assembly having interior passages adapted to receive cylindrical objects from each end and an outer surface which is tapered from adjacent the midpoint outwardly to the ends; and
   c. a pair of collars, each having a tapered passage therethrough, said collars being slidably mounted on each end of the jaw assembly with the wider end of the passage being placed on the assembly first so that upon driving the collars along the tapered surface of the assembly towards the midpoint, the jaw segments are axially compressed down onto cylindrical objects which may be placed in the passage of the assembly.

* * * * *